United States Patent
Ge

(10) Patent No.: US 10,563,619 B2
(45) Date of Patent: Feb. 18, 2020

(54) AEROSPACE TURBOFAN ENGINES

(71) Applicant: Minglong Ge, Beijing (CN)

(72) Inventor: Minglong Ge, Beijing (CN)

(*) Notice: Subject to any disclaimer, the term of this patent is extended or adjusted under 35 U.S.C. 154(b) by 0 days.

(21) Appl. No.: 16/188,283

(22) Filed: Nov. 13, 2018

(65) Prior Publication Data
US 2019/0093603 A1 Mar. 28, 2019

Related U.S. Application Data

(63) Continuation of application No. PCT/CN2016/000335, filed on Jun. 22, 2016.

(51) Int. Cl.
| | |
|---|---|
| *F02K 9/64* | (2006.01) |
| *F02K 3/10* | (2006.01) |
| *F23R 3/20* | (2006.01) |
| *F02K 9/42* | (2006.01) |
| *F23R 7/00* | (2006.01) |

(Continued)

(52) U.S. Cl.
CPC ............ *F02K 9/64* (2013.01); *F02K 3/10* (2013.01); *F02K 3/11* (2013.01); *F02K 9/42* (2013.01); *F02K 9/78* (2013.01); *F02K 9/972* (2013.01); *F02K 99/00* (2013.01); *F23R 3/20* (2013.01); *F23R 3/42* (2013.01); *F23R 3/58* (2013.01); *F23R 3/60* (2013.01); *F23R 7/00* (2013.01); *F05D 2260/20* (2013.01); *Y02E 20/344* (2013.01)

(58) Field of Classification Search
CPC ... F02K 3/10; F02K 3/105; F02K 3/11; F02K 9/42; F02K 9/64; F02K 9/78; F02K 9/972; F02K 99/00; F05D 2220/74; F23R 3/20; F23R 3/42; F23R 3/60; F23R 7/00
See application file for complete search history.

(56) References Cited

U.S. PATENT DOCUMENTS 2,628,473 A * 2/1953 Frye .................. F02K 7/005
100/911
3,229,459 A * 1/1966 Cervenka ............... B64G 1/401
60/244

(Continued)

FOREIGN PATENT DOCUMENTS

| CN | 103437914 A | 12/2013 |
|---|---|---|
| CN | 103775246 A | 5/2014 |

(Continued)

*Primary Examiner* — Scott J Walthour
(74) *Attorney, Agent, or Firm* — Wayne & Ken, LLC; Tony Hom

(57) ABSTRACT

An aerospace turbofan engine that injects oxygen-enriched gas from an inlet includes an oxygen-enriched gas injection component, a body structure, an afterburner middle portion and a first afterburner outer ring. An aerospace turbofan engine that injects oxygen-enriched gas from an inlet and an afterburner individually or simultaneously includes an oxygen-enriched gas injection component, a body structure, an afterburner middle portion and a second afterburner outer ring. The aerospace turbofan engines which fully utilize oxygen in the atmosphere for combustion and work in various flight altitude ranges adopt regenerative cooling-type afterburners with acoustic cavity and baffle plates, so that an aircraft can fly to an altitude of 20-50 km and reach a speed of Mach 2-5. Variants of the aerospace turbofan engines are disclosed.

14 Claims, 7 Drawing Sheets

(51) Int. Cl.
*F23R 3/42* (2006.01)
*F02K 3/11* (2006.01)
*F23R 3/60* (2006.01)
*F02K 9/97* (2006.01)
*F02K 9/78* (2006.01)
*F02K 99/00* (2009.01)
*F23R 3/58* (2006.01)

(56) References Cited

U.S. PATENT DOCUMENTS

| | | | | |
|---|---|---|---|---|
| 3,237,400 A | * | 3/1966 | Kuhrt | F02C 1/007 60/246 |
| 3,898,794 A | | 8/1975 | Ariga | |
| 5,272,870 A | * | 12/1993 | Grieb | F02C 7/185 60/267 |
| 5,335,490 A | * | 8/1994 | Johnson | F01D 9/065 60/740 |
| 6,973,774 B1 | * | 12/2005 | Wood | F02C 6/18 239/265.19 |
| 7,305,816 B2 | * | 12/2007 | Freese | F02K 3/10 60/218 |
| 2003/0079463 A1 | * | 5/2003 | McKinney | F02K 9/78 60/204 |
| 2006/0213180 A1 | * | 9/2006 | Koshoffer | F02K 3/10 60/226.1 |
| 2015/0007549 A1 | * | 1/2015 | Bossard | F02K 9/78 60/204 |

FOREIGN PATENT DOCUMENTS

| | | |
|---|---|---|
| CN | 203604064 U | 5/2014 |
| CN | 103842728 A | 6/2014 |
| CN | 104632467 A | 5/2015 |
| CN | 105222159 A | 1/2016 |
| EP | 1172544 A1 | 1/2002 |
| GB | 1410543 A | 10/1975 |

\* cited by examiner

AEROSPACE TURBOFAN ENGINES

CROSS-REFERENCE TO RELATED APPLICATIONS

This application is a continuation of International Application No. PCT/CN2016/000335 with a filing date of Jun. 22, 2016, designating the United States, now pending, and further claims to Chinese Application No. 201610326598.2 with a filing date of May 18, 2016. The content of the aforementioned applications, including any intervening amendments thereto, are incorporated herein by reference.

TECHNICAL FIELD

The present disclosure relates to aerospace turbofan engines, and in particular to integrated aerospace engines which fully utilize oxygen in the atmosphere for combustion and work in various flight altitude ranges.

BACKGROUND

Aero gas turbine engines such as aero turbofan engines have developed to a high technological level during the past 70 years. However, since atmospheric density and oxygen decrease with the increase of flight altitudes, engine thrusts using air as an oxidant are decreased, and thus an aircraft cannot fly too high and too fast. Airliners usually cruise at an altitude of 10 km and at a speed of nearly Mach 1. Military aircrafts can fly higher at supersonic speed; however the increase of Mach number and the flight altitude is limited.

Liquid rocket engines that can work at any altitudes also have a high technological level after over 70 years of developments. Some liquid rocket engines are used for propelling rocket aircrafts over a flight altitude of 20 km and above a speed of Mach 2, for example, American AR2-3 rocket engine. However, such engine requires a consumption of much more hydrogen peroxide having a concentration of 90% as oxidant than aviation kerosene. Such engine is not economical, and the flight speed, altitude and duration are limited due to the heavy-load oxidant.

The inventor has studied an engine that makes full use of oxygen in the atmosphere for combustion and works at various altitudes, and filed a Chinese Patent No. CN 105841193B, titled "Two Aerospace Turbofan Engines". An International Patent Application No. PCT/CN2016/000335 which claims priority from the Chinese Patent No. CN 105841193B has been filed and published on Nov. 23, 2017 (WO 2017/197544 A1).

SUMMARY

Aero gas turbine engines are limited to working altitudes. The liquid rocket engines capable of working at any altitudes are unable to use air for combustion. In order to solve the problems in the prior art, an engine which makes full use of oxygen in the atmosphere for combustion and works at various altitude ranges is developed. In the present disclosure, an aero turbofan engine and a liquid rocket engine are integrated to design aerospace turbofan engines including basic aerospace turbofan engines and variants thereof.

In an embodiment, a basic aerospace turbofan engine (referred to as the "first aerospace turbofan engine") that injects oxygen-enriched gas from an inlet includes an oxygen-enriched gas injection component at a front part of the first aerospace turbofan engine; a body structure at a middle part of the first aerospace turbofan engine; an afterburner middle portion; and a first afterburner outer ring.

The oxygen-enriched gas injection component of the first aerospace turbofan engine includes an oxygen-enriched gas three-way pipe, an oxygen-enriched gas introduction pipe, an oxygen-enriched gas collector and an oxygen-enriched gas injection ring. The oxygen-enriched gas injection ring is welded or disposed on an outer wall of the inlet. Hot oxygen-enriched gas is introduced to the inlet as needed through a plurality of radial holes which are formed on and uniformly distributed along a circumference of the oxygen-enriched gas injection ring, so as to supply the oxygen-enriched gas during high-altitude flight in hypoxic environments.

The oxygen-enriched gas is a gas composed of oxygen and water vapor. It is produced by catalytic decomposition of hydrogen peroxide with a medium concentration of 70-79%. A highest decomposition temperature of the oxygen-enriched gas is 322-485° C. Highest combustion temperatures for the oxygen-enriched gas with aviation kerosene and liquid hydrogen are 1958-2228° C. and 2020-2277° C., respectively, which are nearly the same as a combustion temperature of 2060° C. of air with aviation kerosene. The hydrogen peroxide with a concentration of 70-79% is non-toxic, colorless, odorless and less corrosive and has high safety. Such hydrogen peroxide has a freezing point of −40 to −25° C. and a boiling point of 125-132° C. It has a density at 25° C. of 1.287-1.330 g/cm$^3$ and a combined density with the aviation kerosene and the liquid hydrogen of 1.227-1.255 g/cm$^3$ and 0.764-0.741 g/cm$^3$, respectively, which is 2 times higher than the combined density of 0.354 g/cm$^3$ of liquid oxygen and liquid hydrogen. The hydrogen peroxide is a good regenerative coolant. A regenerative cooling-type afterburner only has a temperature rise of 20-30° C. usually. The hydrogen peroxide is economical and has low cost.

The body structure of the first aerospace turbofan engine has been modified slightly as compared to the body structure of the existing aero turbofan engine for appropriate connection with the afterburner, that is, a thickened inner wall of an outer duct and an outer wall flange of the outer duct are additionally provided on the present body structure. The body structure includes an inlet outer wall, a low-pressure compressor, a high-pressure compressor, a primary combustion chamber, a high-pressure turbine, a low-pressure turbine, a central exhaust nozzle, and the outer wall, the thickened inner wall and the outer wall flange of the outer duct. For parts which are in contact with the gas from the inlet, materials used therein need to change to adapt to a gas mixture of air and oxygen-enriched gas at higher temperature, and even to single oxygen-enriched gas at highest temperature, instead of air at low temperature. In another aspect, a feed system for oxygen-enriched gas can reduce the temperature of the fed oxygen-enriched gas through incomplete decomposition of the hydrogen peroxide and heat dissipation of the oxygen-enriched gas in a heat exchanger.

In the first aerospace turbofan engine, the afterburner middle portion includes a nozzle outer wall, a fuel collector and a fuel introduction pipe. A plurality of fuel vertical holes are formed on and uniformly distributed along a circumference of the nozzle outer wall. A plurality of fuel oblique holes are formed on and uniformly distributed along a circumference of the fuel collector. These holes are configured to inject the aviation kerosene or liquid hydrogen fuel into the afterburner for afterburning.

In the first aerospace turbofan engine, the first afterburner outer ring is provided with an acoustic cavity and a plurality of baffle plates to inhibit unstable high-frequency combustion for the purpose of vibration reduction. A plurality of fanned straight flutes having the same width and arc length as one another are formed on and uniformly distributed along the circumference of the acoustic cavity. A plurality of acoustic cavity ribs are arranged between the fanned straight flutes. Unlike acoustic cavity ribs of a rocket thrust chamber, the acoustic cavity ribs between the straight flutes do not conduct regenerative cooling due to low ambient temperature. The straight flutes include two types: a plurality of deep acoustic cavities configured to inhibit first-order tangential acoustic vibration; and a plurality of shallow acoustic cavities configured to inhibit first-order radial acoustic vibration. The deep and shallow acoustic cavities are in a alternate arrangement with an alternating ratio of 2:1, 1:1 or 1:2. When the baffle plates are not provided, the ratio is 2:1, that is, two deep acoustic cavities and one shallow acoustic cavity are arranged alternately. When the baffle plates for inhibiting the first-order tangential acoustic vibration are arranged, the ratio is 1:1 or 1:2. Screw pile holes are formed in metal solid portions of the shallow acoustic cavities. The baffle plates are of high-temperature resistance. Six or more baffle plates are uniformly distributed along the circumference of the first afterburner outer ring and are fixedly welded on the inner side surfaces of the acoustic cavity and under the acoustic cavity ribs.

The first afterburner outer ring of the first aerospace turbofan engine further includes a plurality of screw piles, a plurality of nuts, a coolant outflow collector, a coolant eduction pipe, a spiral groove inner wall, a spiral groove outer wall, a coolant inflow collector and a coolant introduction pipe. A plurality of spiral grooves through which the hydrogen peroxide having a concentration of 70-79% flows for regenerative cooling are milled on an outer surface of the spiral groove inner wall. The spiral groove inner wall is brazed together with the spiral groove outer wall into a whole. The spiral groove outer wall upon entire processing is sectioned longitudinally into two symmetrical halves. The two symmetrical halves are welded into a whole when the two symmetrical halves are fitted in the spiral groove inner wall.

A first regenerative cooling-type afterburner with the acoustic cavity and baffle plates is formed by the afterburner middle portion and the first afterburner outer ring of the first aerospace turbofan engine.

In order to solve the problem that passengers on the aircraft at high altitude need oxygen inhalation, one way in the oxygen-enriched gas three-way pipe is to deliver the oxygen-enriched gas to an air source system of the aircraft.

In another embodiment, a basic aerospace turbofan engine (referred to as "the second aerospace turbofan engine") that injects oxygen-enriched gas from an inlet and an afterburner individually or simultaneously. The only difference between this embodiment and the above embodiment is that the first afterburner outer ring is replaced with a second afterburner outer ring. The second afterburner outer ring includes an acoustic cavity, a plurality of screw piles, a plurality of nuts, a dual collector, an annular cover plate, an oxygen-enriched gas intake pipe, an oxygen-enriched gas three-way pipe, an angular cover plate, a coolant eduction pipe, a spiral groove inner wall, a spiral groove outer wall, a coolant inflow collector, a coolant intake pipe and a plurality of baffle plates. The dual collector integrates collection of both inflow of the oxygen-enriched gas and outflow of the coolant.

A plurality of oxygen-enriched gas holes configured to inject the oxygen-enriched gas into the afterburner are formed on and uniformly distributed along a circumference of the dual collector. The oxygen-enriched gas holes and the fuel oblique holes together form a gas-liquid injection unit at an included angle of 60-100 degrees.

A second regenerative cooling-type afterburner with the acoustic cavity and the baffle plates is formed by the afterburner middle portion and the second afterburner outer ring of the second aerospace turbofan engine.

In yet another embodiment, a variant of the first aerospace turbofan engine (referred to as "the third aerospace turbofan engine") is designed and obtained by removing the oxygen-enriched gas jet component from the first aerospace turbofan engine. The third aerospace turbofan engine includes a body structure, an afterburner middle portion and a first afterburner outer ring. Such aerospace turbofan engine introduces no oxygen-enriched gas and the first afterburner outer ring uses kerosene or liquid hydrogen fuel as a coolant.

In still another embodiment, a variant of the second aerospace turbofan engine (referred to as "the fourth aerospace turbofan engine") is designed and obtained by removing the oxygen-enriched gas jet component from the second aerospace turbofan engine. The fourth aerospace turbofan engine includes a body structure, an afterburner middle portion and a second afterburner outer ring. Such aerospace turbofan engine, also called a tandem turbine-rocket combined engine, introduces oxygen-enriched gas from the afterburner.

The aerospace turbofan engines as described above have the advantages and beneficial effects as follows:

1. The oxygen in the atmosphere is introduced to participate in combustion from the ground to different flight altitudes, thereby realizing an economy and light load. When the aircraft is propelled to rise and descend, there usually exists a non-afterburning condition at an altitude of 0-10 km, the present aerospace turbofan engines with fuel economy do not consume any oxidants other than air. The third aerospace turbofan engine has full afterburning without consuming any oxidant other than air.

2. The second and fourth aerospace turbofan engines have full afterburning of injecting the oxygen-enriched gas into the afterburner. The former has full afterburning of injecting the oxygen-enriched gas into both the inlet and the afterburner, enabling the aircraft to fly to an altitude of 20-30 km and at a speed of Mach 2-3.

3. The first and second aerospace turbofan engines have full afterburning of injecting the oxygen-enriched gas into the inlet individually, enabling the aircraft to fly to an altitude of 30-50 km and at a speed of Mach 3-5. Theoretically, the first and second aerospace turbofan engines can also work at higher altitudes and propel the aircraft to reach a higher speed.

4. The present aerospace turbofan engines adopt the bodies of the aero turbofan engines in the prior art and utilize the acoustic cavity, the baffle plates and the regenerative cooling technology of the liquid rocket engine at the same time, which is beneficial to their development and application.

The basic aerospace turbofan engines of the present disclosure are integrated aerospace engines which make full use of oxygen in the atmosphere for combustion and operate at various altitudes. The variant of the second aerospace turbofan engines are also integrated aerospace engines and have higher operation altitudes than the existing aero turbofan engines, but cannot operate in oxygen-free or severely hypoxic environments. The variant of the first aerospace turbofan engine is a combined aerospace engine, and the afterburner is designed using the acoustic cavity, the baffle plates and the regenerative cooling technology of the liquid rocket engine. The present engines are suitable for propelling integrated aerospace aircrafts such as new supersonic passenger aircrafts, initial suborbital space tourist aircrafts, hypersonic drones and super-large aircrafts for rocket launch.

DETAILED DESCRIPTION OF EMBODIMENTS

Figure 1:
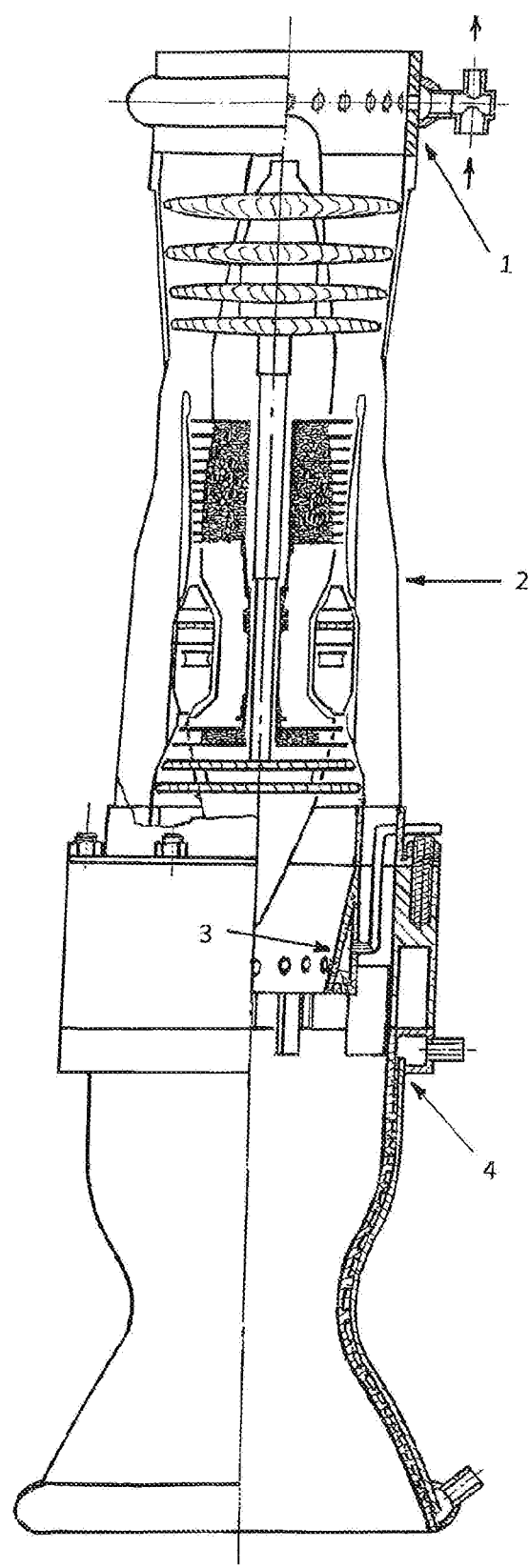
FIG. 1 is a schematic diagram of an aerospace turbofan engine according to a first embodiment.
Figure 2:
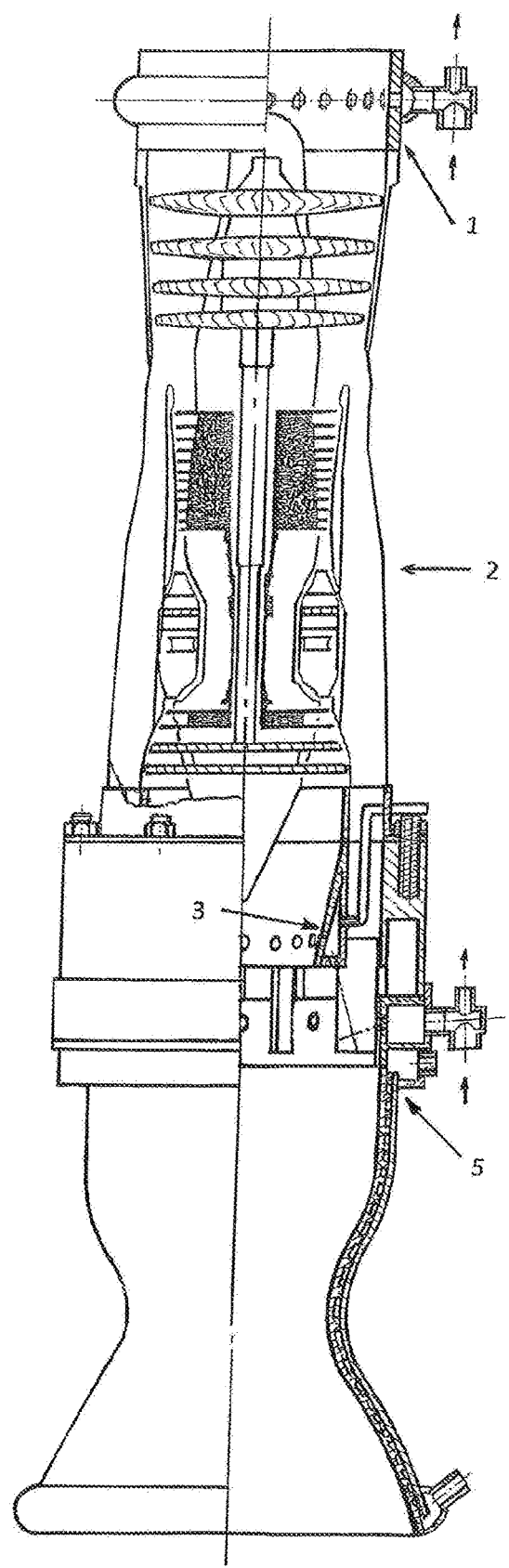
FIG. 2 is a schematic diagram of an aerospace turbofan engine according to a second embodiment.
Figure 3:
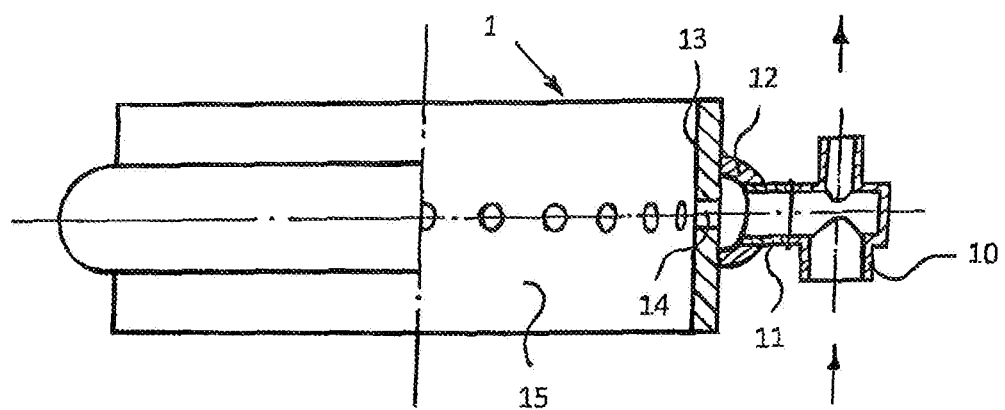
FIG. 3 is a schematic diagram of an oxygen-enriched gas jet component.

FIGS. 1-6 and 7A-7C show embodiments of basic aerospace turbofan engines of the first and second embodiments of the present disclosure. Structures of variants of aerospace turbofan engines can also be seen from the figures.

As shown in FIGS. 1, 3-5 and 7A-7C, in a first embodiment, a basic aerospace turbofan engine (referred to as the "first aerospace turbofan engine") that injects oxygen-enriched gas from an inlet includes an oxygen-enriched gas injection component 1, a body structure 2, an afterburner middle portion 3 and a first afterburner outer ring 4. The oxygen-enriched gas injection component 1 includes an oxygen-enriched gas three-way pipe 10, an oxygen-enriched gas introduction pipe 11, an oxygen-enriched gas collector 12 and an oxygen-enriched gas injection ring 13. The body structure 2 includes an inlet outer wall 20, a low-pressure compressor 21, a high-pressure compressor 22, a primary combustion chamber 23, a high-pressure turbine 24, a low-pressure turbine 25, a central exhaust nozzle 26, an outer wall 27 of an outer duct, a thickened inner wall 28 of the outer duct, and an outer wall flange 29 of the outer duct. The afterburner middle portion 3 includes a nozzle outer wall 30, a fuel collector 31 and a fuel introduction pipe 32. The first afterburner outer ring 4 includes an acoustic cavity 40, a plurality of screw piles 41, a plurality of nuts 42, a coolant outflow collector 43, a coolant eduction pipe 44, a spiral groove inner wall 45, a spiral groove outer wall 46, a coolant inflow collector 47, a coolant introduction pipe 48, and a plurality of baffle plates 49. All parts except the body structure 2, the plurality of screw piles 41 and the plurality of nuts 42 are fixedly welded. The oxygen-enriched gas injection ring 13 is provided with a plurality of radial holes 14 configured to inject oxygen-enriched gas into an inlet 15 and uniformly distributed along a circumference of the oxygen-enriched gas injection ring 13. The oxygen-enriched gas composed of oxygen and water vapor is a gas produced by catalytic decomposition of hydrogen peroxide with a medium concentration of 70-79%. The nozzle outer wall 30 and the fuel collector 31 are provided with a plurality of fuel vertical holes 33 and a plurality of fuel oblique holes 34 which are configured to inject kerosene or liquid hydrogen fuel into the afterburner 50. A plurality of spiral grooves 51 through which the hydrogen peroxide having a concentration of 70-79% flows for regenerative cooling are milled on the outer surface of the spiral groove inner wall 45. The spiral groove inner wall 45 is brazed together with the spiral groove outer wall 46 into a whole.

As shown in FIGS. 2-4, 6 and 7A-7C, in a second embodiment, a basic aerospace turbofan engine (referred to as "the second aerospace turbofan engine") that injects oxygen-enriched gas from an inlet and an afterburner individually or simultaneously. The second aerospace turbofan engine includes an oxygen-enriched gas injection component 1, a body structure 2, an afterburner middle portion 3 and a second afterburner outer ring 5. The oxygen-enriched gas injection component 1 includes an oxygen-enriched gas three-way pipe 10, an oxygen-enriched gas introduction pipe 11, an oxygen-enriched gas collector 12 and an oxygen-enriched gas injection ring 13. The body structure 2 includes an inlet outer wall 20, a low-pressure compressor 21, a high-pressure compressor 22, a primary combustion chamber 23, a high-pressure turbine 24, a low-pressure turbine 25, a central exhaust nozzle 26, an outer wall 27 of an outer duct, a thickened inner wall 28 of the outer duct and an outer wall flange 29 of the outer duct. The afterburner middle portion 3 includes a nozzle outer wall 30, a fuel collector 31 and a fuel introduction pipe 32. The second afterburner outer ring 5 includes an acoustic cavity 40, a plurality of screw piles 41, a plurality of nuts 42, a dual collector 52, an annular cover plate 53, an oxygen-enriched gas introduction pipe 11, an oxygen-enriched gas three-way pipe 10, an angular cover plate 54, a coolant eduction pipe 44, a spiral groove inner wall 45, a spiral groove outer wall 46, a coolant inflow collector 47, a coolant introduction pipe 48, and a plurality of baffle plates 49. All parts except the body structure 2, the a plurality of screw piles 41 and the a plurality of nuts 42 are fixedly welded. The oxygen-enriched gas injection ring 13 is provided with a plurality of radial holes 14 configured to inject oxygen-enriched gas into the inlet 15 and uniformly distributed along the circumference of the oxygen-enriched gas injection ring 13. The dual collector 52 is provided with a plurality of oxygen-enriched gas holes 55 configured to inject the oxygen-enriched gas into the afterburner 50 and uniformly distributed along a circumference of the dual collector 52. The oxygen-enriched gas composed of oxygen and water vapor is a gas produced by catalytic decomposition of hydrogen peroxide with a medium concentration of 70-79%. The nozzle outer wall 30 and the fuel collector 31 are provided with the plurality of fuel vertical holes 33 and the plurality of fuel oblique holes 34 which are configured to inject kerosene or liquid hydrogen fuel into the afterburner 50. The plurality of spiral grooves 51 through which the hydrogen peroxide having a concentration of 70-79% flows for regenerative cooling are milled on the outer surface of the spiral groove inner wall 45. The spiral groove inner wall 45 is brazed together with the spiral groove outer wall 46 into a whole.

Figure 4:
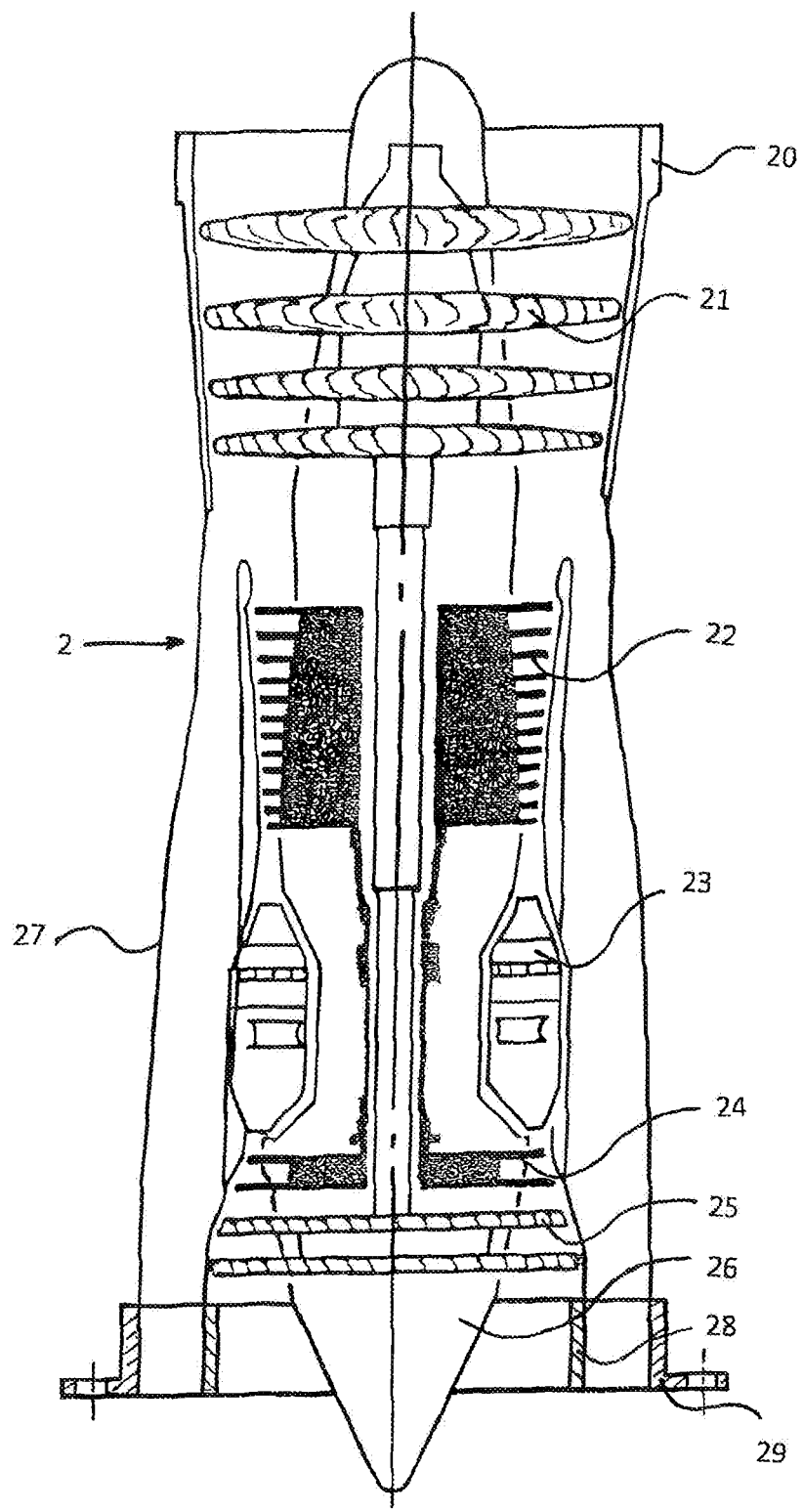
FIG. 4 is a schematic diagram of a body structure.

As shown in FIG. 4, for the basic aerospace turbofan engines, the body structure 2 has been modified slightly as compared to the body of the existing aero turbofan engine, and further provided with the thickened inner wall 28 of the outer duct and the outer wall flange 29 of the outer duct. The thickened inner wall 28 of the outer duct is integrally welded with the afterburner middle portion 3. The outer wall flange 29 of the outer duct is integrally threaded to the acoustic cavity 40.

Figure 5:
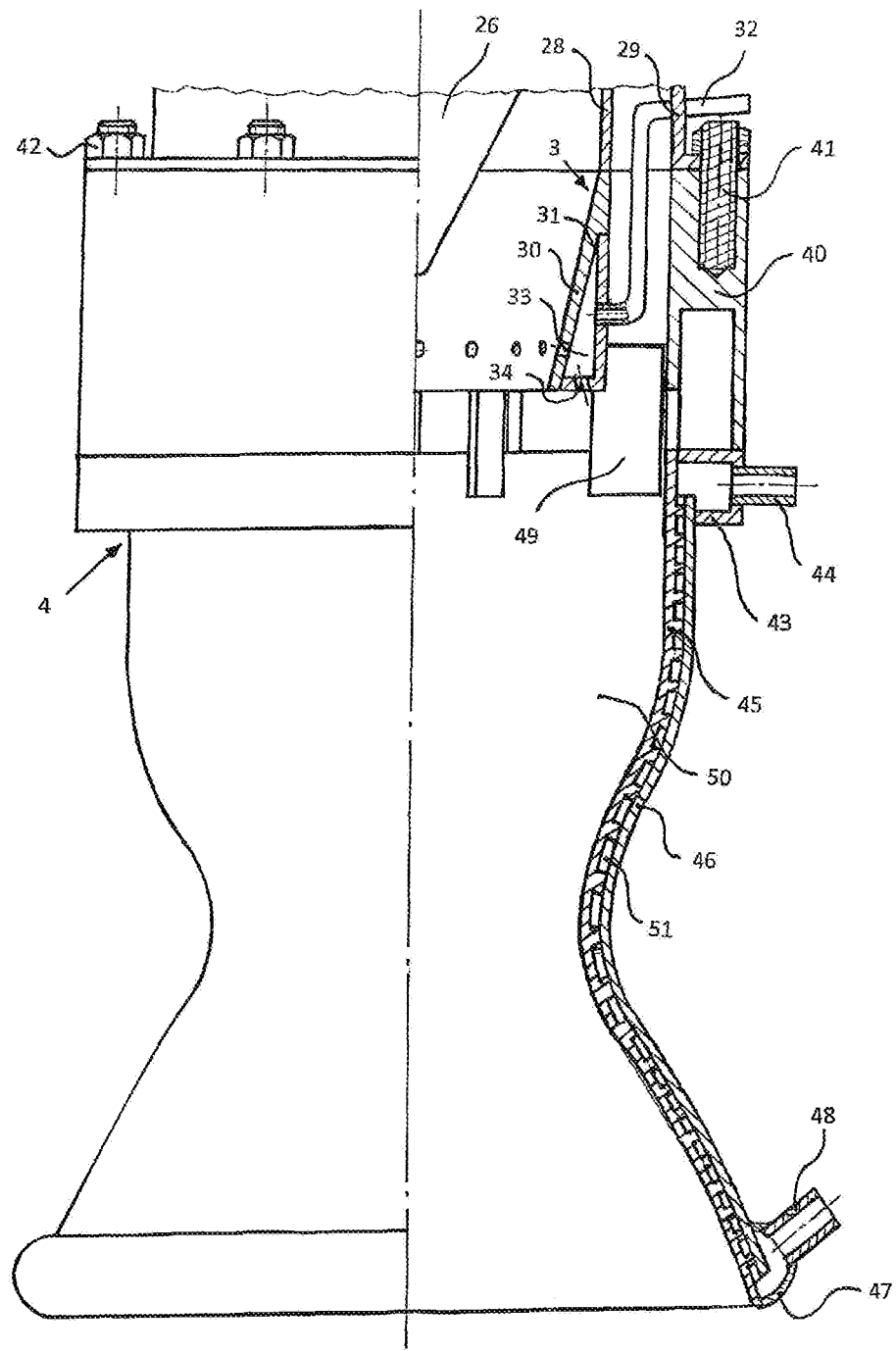
FIG. 5 is a schematic diagram of a first regenerative cooling-type afterburner with acoustic cavity and baffle plates.
Figure 6:
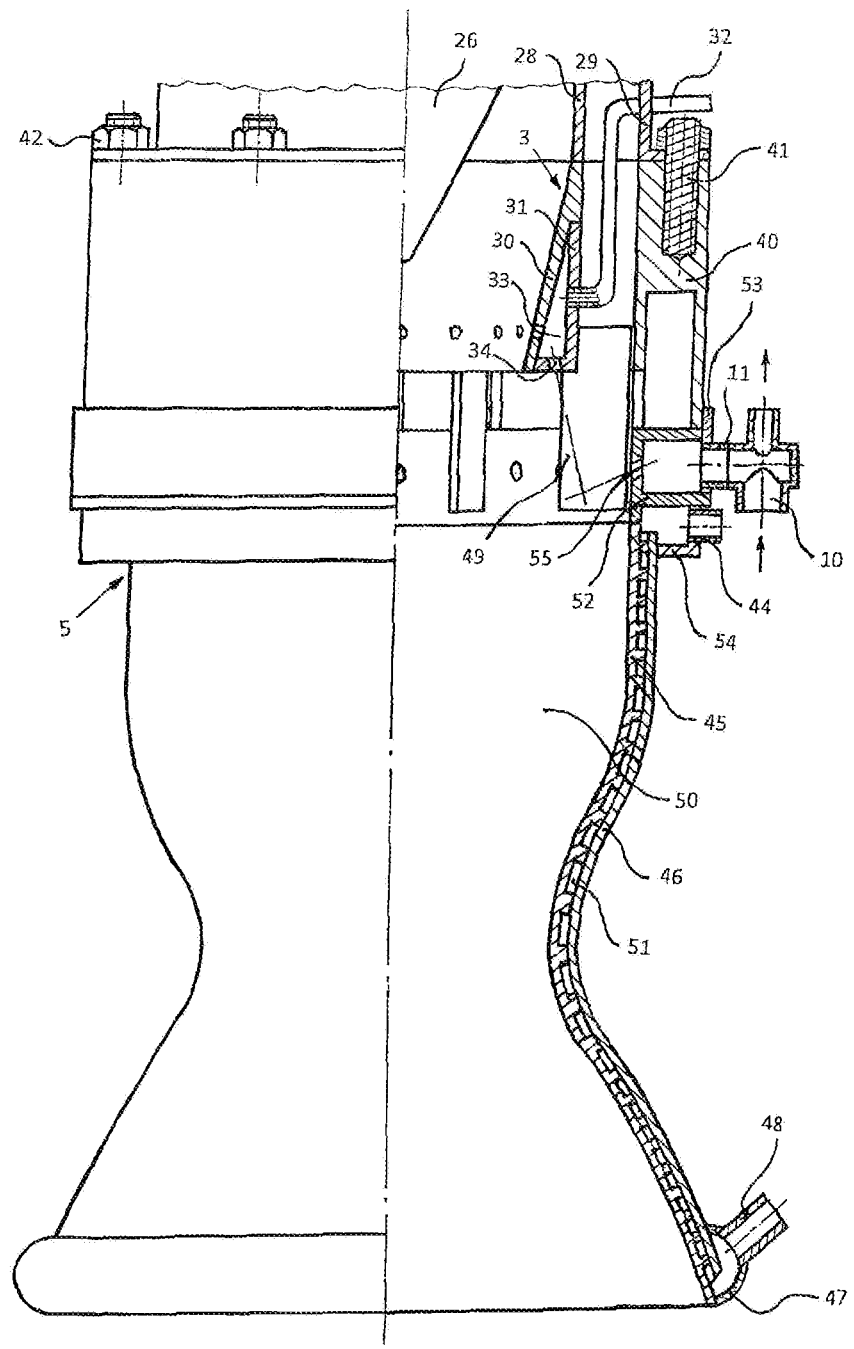
FIG. 6 is a schematic diagram of a second regenerative cooling-type afterburner with acoustic cavity and baffle plates.
Figure 7A:
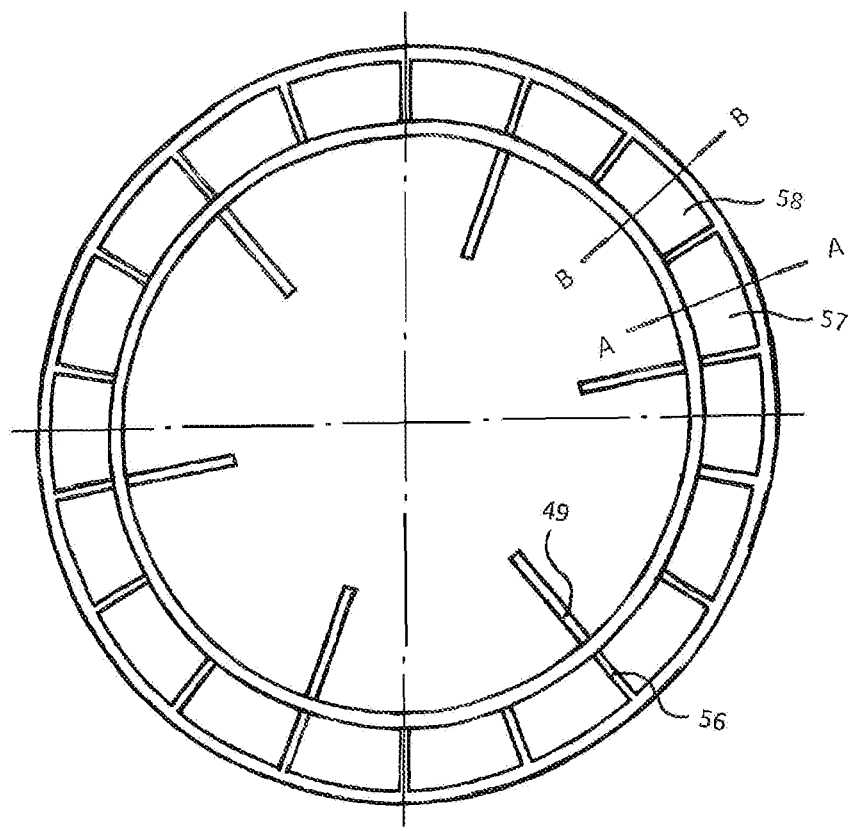
FIG. 7A is a bottom view of an acoustic cavity.
Figure 7B:
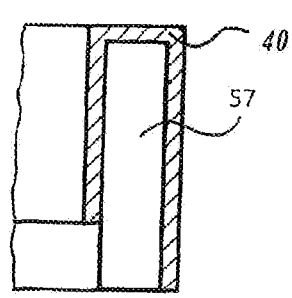
FIG. 7B is a sectional view taken along A-A line of FIG. 7A.
Figure 7C:
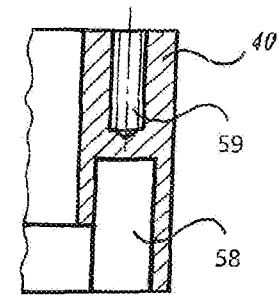
FIG. 7C is a sectional view taken along B-B line of FIG. 7A.

As shown in FIGS. 5-6, for the basic aerospace turbofan engines, the nozzle outer wall 30 is fitted with the central exhaust nozzle 26, and is provided with the plurality of fuel vertical holes 33 which are perpendicular to the nozzle outer wall 30 and have different diameters. The fuel collector 31 is provided with the plurality of fuel oblique holes 34 which have an angle of 10-60 degrees with an axis. The plurality of fuel vertical holes 33 are uniformly distributed along a circumference of the nozzle outer wall 30. The plurality of fuel oblique holes 34 are uniformly distributed along a circumference of the fuel collector 31. The plurality of fuel oblique holes 34 and the plurality of oxygen-enriched gas holes 55 form a gas-liquid injection unit at an angle of 60-100 degrees.

As shown in FIGS. 5-7, for the basic aerospace turbofan engines, the acoustic cavity 40 are provided with a plurality of fanned straight flutes which are uniformly distributed along a circumference of the first afterburner outer ring 4 and the second afterburner outer ring 5. The plurality of fanned straight flutes have the same width and arc length as one another. A plurality of acoustic cavity ribs 56 which do not conduct regenerative cooling are arranged between the plurality of fanned straight flutes. The fanned straight flutes include a plurality of deep acoustic cavities 57 and a plurality of shallow acoustic cavities 58 which are in an alternate arrangement at an alternating ratio of 2:1, 1:1 or 1:2. A plurality of screw pile holes 59 are formed in metal solid portions of the shallow acoustic cavities 58.

As shown in FIGS. 5-7, for the basic aerospace turbofan engines, the plurality of baffle plates 49 is of high-temperature resistance. Six or more baffle plates 49 are uniformly distributed along the circumference of the first afterburner outer ring 4 and the second afterburner outer ring 5 and are fixedly welded on the inner side surface of the acoustic cavity 40 along a direction that acoustic cavity ribs 56 extend radially.

As shown in FIGS. 5-6, for the basic aerospace turbofan engines, the spiral groove outer wall 46 upon entire processing is sectioned longitudinally into two symmetrical halves. The two symmetrical halves are welded into a whole when fitted in the spiral groove inner wall 45.

As shown in FIGS. 1-3 and 6, for the basic aerospace turbofan engines, one way in the oxygen-enriched gas three-way pipe 10 is configured to deliver the oxygen-enriched gas into an air source system of the aircraft.

As shown in FIGS. 1, 4, 5 and 7A-7C, a variant of the first aerospace turbofan engine (referred to as "the third aerospace turbofan engine") is designed and obtained by removing the oxygen-enriched gas jet component from the first aerospace turbofan engine. The third aerospace turbofan engine includes a body structure 2, an afterburner middle portion 3 and a first afterburner outer ring 4. Such aerospace turbofan engine introduces no oxygen-enriched gas. The first afterburner outer ring 4 uses the kerosene or liquid hydrogen fuel as coolant.

As shown in FIGS. 2, 4, 6 and 7A-7C, a variant of the second aerospace turbofan engine (referred to as "the fourth aerospace turbofan engine") is designed and obtained by removing the oxygen-enriched gas jet component from the second aerospace turbofan engine. The fourth aerospace turbofan engine includes a body structure 2, an afterburner middle portion 3 and a second afterburner outer ring 5. Such aerospace turbofan engine, also called a tandem turbine-rocket combined engine, introduces oxygen-enriched gas from the afterburner.

What is claimed is:
1. An aerospace turbofan engine, comprising:
a body structure; and
an afterburner, the afterburner comprising:
   an afterburner middle portion; and
   an afterburner outer ring;
   wherein the afterburner outer ring is configured to use kerosene or liquid hydrogen fuel as a coolant;
wherein the body structure comprises:
   an inlet outer wall;
   a low-pressure compressor;
   a high-pressure compressor;
   a primary combustion chamber;
   a high-pressure turbine;
   a low-pressure turbine;
   a central exhaust nozzle;
   an outer wall of an outer duct;
   an inner wall of the outer duct; and
   an outer wall flange of the outer duct;
   wherein the low-pressure compressor plays a role as a fan is configured to supply a first portion of a working fluid to a bypass passage defined by the outer duct such that the first portion of the working fluid bypasses the high-pressure compressor, the primary combustion chamber, and the high-pressure turbine, the low-pressure compressor further configured to supply a second portion of the working fluid to the high-pressure compressor;
wherein the afterburner middle portion comprises:
   a nozzle outer wall;
   a fuel collector; and
   a fuel introduction pipe;
wherein the afterburner outer ring comprises:
   an acoustic cavity;
   a plurality of screw piles;
   a plurality of nuts;
   a coolant outflow collector;
   a coolant eduction pipe;
   a spiral groove inner wall;
   a spiral groove outer wall,
   a coolant inflow collector;
   a coolant introduction pipe; and
   a plurality of baffle plates;
wherein the afterburner middle portion and the afterburner outer ring are respectively formed by welding; the afterburner middle portion is connected to the body structure via a welded connection between the inner wall of the outer duct and the nozzle outer wall; and the outer wall flange of the outer duct of the body is connected to the acoustic cavity of the afterburner outer ring by the plurality of screw piles and the plurality of nuts;
a plurality of fuel vertical holes are formed on the nozzle outer wall perpendicular to a wall surface of the nozzle outer wall;
a plurality of fuel oblique holes are formed on the fuel collector;
the plurality of fuel vertical holes and the plurality of fuel oblique holes are configured to inject kerosene or liquid hydrogen fuel into the afterburner for afterburning, the plurality of fuel vertical holes being perpendicular to a wall surface of the nozzle outer wall; and
a plurality of spiral grooves, configured to channel the kerosene or liquid hydrogen fuel for regenerative cooling, are milled on an outer surface of the spiral groove inner wall, wherein the spiral groove inner wall is brazed to the spiral groove outer wall.

2. An aerospace turbofan engine, comprising:
a body structure; and
an afterburner, the afterburner comprising:
  an afterburner middle portion; and
  an afterburner outer ring configured to introduce oxygen-enriched gas;
wherein the body structure comprises:
  an inlet outer wall;
  a low-pressure compressor;
  a high-pressure compressor;
  a primary combustion chamber;
  a high-pressure turbine;
  a low-pressure turbine;
  a central exhaust nozzle;
  an outer wall of an outer duct;
  an inner wall of the outer duct; and
  an outer wall flange of the outer duct;
  wherein the low-pressure compressor is configured to supply a first portion of a working fluid to a bypass passage defined by the outer duct such that the first portion of the working fluid bypasses the high-pressure compressor, the primary combustion chamber, and the high-pressure turbine, the low-pressure compressor further configured to supply a second portion of the working fluid to the high-pressure compressor;
wherein the afterburner middle portion comprises:
  a nozzle outer wall;
  a fuel collector; and
  a fuel introduction pipe;
wherein the afterburner outer ring comprises:
  an acoustic cavity;
  a plurality of screw piles;
  a plurality of nuts;
  a dual collector;
  an annular cover plate;
  an oxygen-enriched gas intake pipe;
  an oxygen-enriched gas three-way pipe;
  an angular cover plate;
  a coolant eduction pipe;
  a spiral groove inner wall;
  a spiral groove outer wall;
  a coolant inflow collector;
  a coolant intake pipe; and
  a plurality of baffle plates,
wherein the afterburner middle portion and the afterburner outer ring are respectively formed by welding;
the afterburner middle portion is connected to the body structure via a welded connection between the inner wall of the outer duct and the nozzle outer wall; and the outer wall flange of the outer duct of the body is connected to the acoustic cavity of the afterburner outer ring by the plurality of screw piles and the plurality of nuts;
  a plurality of oxygen-enriched gas holes are formed on the dual collector and uniformly distributed along a circumference of the dual collector;
  the oxygen-enriched gas is composed of oxygen and water vapor and is produced by catalytic decomposition of hydrogen peroxide with a concentration of 70-79%;
  a plurality of fuel vertical holes are formed on the nozzle outer wall perpendicular to a wall surface of the nozzle outer wall;
  a plurality of fuel oblique holes are formed on the fuel collector;
  the plurality of fuel vertical holes and the plurality of fuel oblique holes are configured to inject kerosene or liquid hydrogen fuel into the afterburner for afterburning; and
  a plurality of spiral grooves, configured to channel the hydrogen peroxide having a concentration of 70-79% for regenerative cooling, are milled on an outer surface of the spiral groove inner wall, wherein the spiral groove inner wall is brazed to the spiral groove outer wall.

3. An aerospace turbofan engine, comprising:
an oxygen-enriched gas injection component configured to inject oxygen-enriched gas into an inlet of the aerospace turbofan engine;
a body structure; and
an afterburner, the afterburner comprising:
  an afterburner middle portion; and
  an afterburner outer ring;
wherein the oxygen-enriched gas injection component comprises:
  an oxygen-enriched gas three-way pipe;
  an oxygen-enriched gas introduction pipe;
  an oxygen-enriched gas collector; and
  an oxygen-enriched gas injection ring;
wherein the body structure comprises:
  an inlet outer wall;
  a low-pressure compressor;
  a high-pressure compressor;
  a primary combustion chamber;
  a high-pressure turbine;
  a low-pressure turbine;
  a central exhaust nozzle;
  an outer wall of an outer duct;
  an inner wall of the outer duct; and
  an outer wall flange of the outer duct;
  wherein the low-pressure compressor is configured to supply a first portion of a working fluid to a bypass passage defined by the outer duct such that the first portion of the working fluid bypasses the high-pressure compressor, the primary combustion chamber, and the high-pressure turbine, and the low-pressure compressor is further configured to supply a second portion of the working fluid to the high-pressure compressor;
wherein the afterburner middle portion comprises:
  a nozzle outer wall;
  a fuel collector; and
  a fuel introduction pipe;
wherein the afterburner outer ring comprises:
  an acoustic cavity;
  a plurality of screw piles;
  a plurality of nuts;
  a coolant outflow collector;
  a coolant eduction pipe;
  a spiral groove inner wall;
  a spiral groove outer wall;
  a coolant inflow collector;
  a coolant introduction pipe; and
  a plurality of baffle plates;
wherein the oxygen-enriched gas injection component, the afterburner middle portion and the afterburner outer ring are respectively formed by welding; the oxygen-enriched gas injection component is connected to the body structure via a welded connection between the oxygen-enriched gas injection ring and the inlet outer wall; the afterburner middle portion is connected to the body structure via a welded connection between the inner wall of the outer duct and the nozzle outer wall; and the outer wall flange of the outer duct of the body is connected to the acoustic cavity of the afterburner outer ring by the plurality of screw piles and the plurality of nuts;

a plurality of radial holes formed on, and uniformly distributed along a circumference of, the oxygen-enriched gas injection ring are configured to inject the oxygen-enriched gas into the inlet;

the oxygen-enriched gas is composed of oxygen and water vapor and is produced by catalytic decomposition of hydrogen peroxide with a concentration of 70-79%;

a plurality of fuel vertical holes are formed on the nozzle outer wall perpendicular to a wall surface of the nozzle outer wall;

a plurality of fuel oblique holes are formed on the fuel collector;

the plurality of fuel vertical holes and the plurality of fuel oblique holes are configured to inject kerosene or liquid hydrogen fuel into the afterburner for afterburning; and a plurality of spiral grooves, configured to channel the hydrogen peroxide having a concentration of 70-79% for regenerative cooling, are milled on an outer surface of the spiral groove inner wall, wherein the spiral groove inner wall is brazed to the spiral groove outer wall.

4. The aerospace turbofan engine of claim 3, wherein the nozzle outer wall is fitted with the central exhaust nozzle; the plurality of fuel vertical holes are uniformly distributed along a circumference of the nozzle outer wall; the plurality of fuel oblique holes have an angle of 10-60 degrees with an axis of the aerospace turbofan engine and are uniformly distributed along a circumference of the fuel collector.

5. The aerospace turbofan engine of claim 3, wherein a plurality of fanned straight flutes having the same width and arc length as one another are formed on the acoustic cavity and uniformly distributed along a circumference of the acoustic cavity; a plurality of acoustic cavity ribs are arranged between the plurality of fanned straight flutes, the plurality of acoustic cavity ribs not being configured to conduct fluid for regenerative cooling; the plurality of fanned straight flutes including a first plurality of fanned straight flutes defining respective deep cavities and a second plurality of fanned straight flutes defining respective shallow cavities, the first plurality of fanned straight flutes and the second plurality of fanned straight flutes being configured in an alternating arrangement with an alternating ratio of 2:1, 1:1 or 1:2; and a plurality of screw pile holes are formed in metal portions of the shallow cavities.

6. The aerospace turbofan engine of claim 5, wherein six or more baffle plates are uniformly distributed along a circumference of the afterburner outer ring and are fixedly welded on inner side surfaces of the acoustic cavity along a direction in which the plurality of acoustic cavity ribs extend radially.

7. The aerospace turbofan engine of claim 3, wherein the spiral groove outer wall is formed by first manufacturing a spirally grooved outer wall part and then longitudinally sectioning the spirally grooved outer wall part into two symmetrical halves, the two symmetrical halves being thereafter brazed to the spiral groove inner wall.

8. The aerospace turbofan engine of claim 3, wherein a first portion of the oxygen-enriched gas three-way pipe is configured to deliver the oxygen-enriched gas to an air source system of an aircraft.

9. An aerospace turbofan engine capable of injecting oxygen-enriched gas into an inlet of the aerospace turbofan engine and an afterburner individually or simultaneously, comprising:

an oxygen-enriched gas injection component configured to inject oxygen-enriched gas into the inlet of the aerospace turbofan engine;

a body structure; and an afterburner, the afterburner comprising:
    an afterburner middle portion; and
    an afterburner outer ring configured to inject oxygen-enriched gas into the afterburner;

wherein the oxygen-enriched gas injection component comprises:
    a first oxygen-enriched gas three-way pipe;
    an oxygen-enriched gas introduction pipe;
    an oxygen-enriched gas collector; and
    an oxygen-enriched gas injection ring;

wherein the body structure comprises:
    an inlet outer wall;
    a low-pressure compressor;
    a high-pressure compressor;
    a primary combustion chamber;
    a high-pressure turbine;
    a low-pressure turbine;
    a central exhaust nozzle;
    an outer wall of an outer duct;
    an inner wall of the outer duct; and
    an outer wall flange of the outer duct;
    wherein the low-pressure compressor is configured to supply a first portion of a working fluid to a bypass passage defined by the outer duct such that the first portion of the working fluid bypasses the high-pressure compressor, the primary combustion chamber, and the high-pressure turbine, the low-pressure compressor further configured to supply a second portion of the working fluid to the high-pressure compressor;

wherein the afterburner middle portion comprises:
    a nozzle outer wall;
    a fuel collector; and
    a fuel introduction pipe;

wherein the afterburner outer ring comprises:
    an acoustic cavity;
    a plurality of screw piles;
    a plurality of nuts;
    a dual collector;
    an annular cover plate;
    an oxygen-enriched gas intake pipe;
    a second oxygen-enriched gas three-way pipe;
    an angular cover plate;
    a coolant eduction pipe;
    a spiral groove inner wall;
    a spiral groove outer wall;
    a coolant inflow collector;
    a coolant intake pipe; and
    a plurality of baffle plates;

wherein the oxygen-enriched gas injection component, the afterburner middle portion and the afterburner outer ring are respectively formed by welding; the oxygen-enriched gas injection component is connected to the body structure via a welded connection between the oxygen-enriched gas injection ring and the inlet outer wall; the afterburner middle portion is connected to the body structure via a welded connection between the inner wall of the outer duct and the nozzle outer wall; and the outer wall flange of the outer duct of the body is connected to the acoustic cavity of the afterburner outer ring by the plurality of screw piles and the plurality of nuts;

a plurality of radial holes formed on, and uniformly distributed along a circumference of, the oxygen-enriched gas injection ring are configured to inject the oxygen-enriched gas into the inlet;

a plurality of oxygen-enriched gas holes are formed on the dual collector and uniformly distributed along a circumference of the dual collector;

the oxygen-enriched gas is composed of oxygen and water vapor and is produced by catalytic decomposition of hydrogen peroxide with a concentration of 70-79%;

a plurality of fuel vertical holes are formed on the nozzle outer wall perpendicular to a wall surface of the nozzle outer wall; a plurality of fuel oblique holes are formed on the fuel collector; the plurality of fuel vertical holes and the plurality of fuel oblique holes are configured to inject kerosene or liquid hydrogen fuel into the afterburner for afterburning; and a plurality of spiral grooves, configured to channel the hydrogen peroxide having a concentration of 70-79% for regenerative cooling, are milled on an outer surface of the spiral groove inner wall, wherein the spiral groove inner wall is brazed to the spiral groove outer wall.

10. The aerospace turbofan engine of claim 9, wherein the nozzle outer wall is fitted with the central exhaust nozzle; the plurality of fuel vertical holes are uniformly distributed along a circumference of the nozzle outer wall; the plurality of fuel oblique holes have an angle of 10-60 degrees with an axis of the aerospace turbofan engine and are uniformly distributed along a circumference of the fuel collector; and the plurality of fuel oblique holes and the plurality of oxygen-enriched gas holes together form a gas-liquid injection unit, wherein an included angle between each of the plurality of fuel oblique holes and each of the plurality of oxygen-enriched gas holes is 60-100 degrees.

11. The aerospace turbofan engine of claim 9, wherein a plurality of fanned straight flutes having the same width and arc length as one another are formed on the acoustic cavity and uniformly distributed along a circumference of the acoustic cavity; a plurality of acoustic cavity ribs are arranged between the plurality of fanned straight flutes, the plurality of acoustic cavity ribs not being configured to conduct fluid for regenerative cooling; the plurality of fanned straight flutes including a first plurality of fanned straight flutes defining respective deep cavities and a second plurality of fanned straight flutes defining respective shallow cavities, the first plurality of fanned straight flutes and the second plurality of fanned straight flutes being configured in an alternating arrangement with an alternating ratio of 2:1, 1:1 or 1:2; and a plurality of screw pile holes are formed in metal portions of the shallow cavities.

12. The aerospace turbofan engine of claim 11, wherein six or more baffle plates are uniformly distributed along a circumference of the afterburner outer ring and are fixedly welded on inner side surfaces of the acoustic cavity along a direction in which the plurality of acoustic cavity ribs extend radially.

13. The aerospace turbofan engine of claim 9, wherein the spiral groove outer wall is formed by first manufacturing a spirally grooved outer wall part and then longitudinally sectioning the spirally grooved outer wall part into two symmetrical halves, the two symmetrical halves being thereafter brazed to the spiral groove inner wall.

14. The aerospace turbofan engine of claim 9, wherein one way in the oxygen-enriched gas three-way pipe is configured to deliver the oxygen-enriched gas to an air source system of an aircraft.

\* \* \* \* \*